(12) United States Patent
White et al.

(10) Patent No.: US 11,453,501 B2
(45) Date of Patent: Sep. 27, 2022

(54) ARRANGEMENT OF INDIVIDUAL SEATS FOR PASSENGERS OF AN AEROPLANE

(71) Applicant: Safran Seats, Plaisir (FR)

(72) Inventors: Jeremy White, Middlesex (GB);
Nicholas Sandham, London (GB);
Richard Seale, Warwickshire (GB);
Omar Chraibi, London (GB)

(73) Assignee: Safran Seats, Plaisir (FR)

( * ) Notice: Subject to any disclaimer, the term of this patent is extended or adjusted under 35 U.S.C. 154(b) by 415 days.

(21) Appl. No.: 16/499,420

(22) PCT Filed: Mar. 29, 2018

(86) PCT No.: PCT/EP2018/058100
§ 371 (c)(1),
(2) Date: Dec. 24, 2019

(87) PCT Pub. No.: WO2018/178246
PCT Pub. Date: Oct. 4, 2018

(65) Prior Publication Data
US 2020/0148363 A1 May 14, 2020

(30) Foreign Application Priority Data
Mar. 31, 2017 (FR) ...................................... 1752815

(51) Int. Cl.
*B64D 11/06* (2006.01)
(52) U.S. Cl.
CPC ...... *B64D 11/0641* (2014.12); *B64D 11/0601* (2014.12); *B64D 11/064* (2014.12); *B64D 11/0606* (2014.12); *B64D 11/0644* (2014.12)
(58) Field of Classification Search
CPC ............ B64D 11/0641; B64D 11/0601; B64D 11/064; B60N 2/34; B63B 2029/043
See application file for complete search history.

(56) References Cited

U.S. PATENT DOCUMENTS

2007/0069073 A1* 3/2007 Ferry ................. B64D 11/0641
244/118.6
2007/0246981 A1* 10/2007 Plant ................. B64D 11/0641
297/248

(Continued)

FOREIGN PATENT DOCUMENTS

FR 2928624 9/2009
FR 3006667 12/2014
(Continued)

OTHER PUBLICATIONS

International Patent Application No. PCT/EP2018/058100, English Translation of Written Opinion of the International Searching Authority, dated Oct. 1, 2019.

(Continued)

*Primary Examiner* — Joshua J Michener
*Assistant Examiner* — Arfan Y. Sinaki
(74) *Attorney, Agent, or Firm* — Kilpatrick Townsend & Stockton LLP (57) ABSTRACT

An arrangement of individual seats intended to be installed in a cabin of an aeroplane includes at least one assembly of two seats turned towards the interior in the direction of the longitudinal axis of the arrangement.
An end assembly includes a first seat and a second seat, each seat being convertible between a sitting position and a recumbent position in which the seat defines a bed surface. An intermediate element includes a surface, referred to as the intermediate surface, located in the same plane as the bed surfaces of the first seat and of the second seat, such that the bed surfaces of the first seat and of the second seat as well as the intermediate surface form a common bed surface.

16 Claims, 7 Drawing Sheets

(56) References Cited

U.S. PATENT DOCUMENTS

| | | | | |
|---|---|---|---|---|
| 2010/0038484 A1* | 2/2010 | Ersan | ............... | B64D 11/06 |
| | | | | 244/118.6 |
| 2010/0065683 A1* | 3/2010 | Darbyshire | ........ | B64D 11/0604 |
| | | | | 244/118.6 |
| 2010/0252680 A1* | 10/2010 | Porter | ............... | B60R 7/043 |
| | | | | 244/118.6 |
| 2012/0305705 A1* | 12/2012 | Vergnaud | ........... | B64D 11/0647 |
| | | | | 244/118.6 |
| 2013/0068887 A1* | 3/2013 | Ko | ............... | B64D 11/0636 |
| | | | | 244/118.6 |
| 2014/0361585 A1* | 12/2014 | Henshaw | ........... | B64D 11/0605 |
| | | | | 297/217.3 |
| 2015/0166182 A1* | 6/2015 | Ducreux | ............... | B64D 11/06 |
| | | | | 244/118.6 |
| 2015/0284082 A1* | 10/2015 | Mayer | ............... | B64D 11/0693 |
| | | | | 244/119 |
| 2015/0336674 A1* | 11/2015 | Foucher | ............ | B64D 11/0606 |
| | | | | 244/118.6 |

FOREIGN PATENT DOCUMENTS

| | | |
|---|---|---|
| GB | 2438162 | 11/2007 |
| WO | 2003013903 | 2/2003 |

OTHER PUBLICATIONS

International Patent Application No. PCT/EP2018/058100, Search Report and Written Opinion, dated May 4, 2018.

\* cited by examiner

ARRANGEMENT OF INDIVIDUAL SEATS FOR PASSENGERS OF AN AEROPLANE

CROSS-REFERENCE TO RELATED APPLICATIONS

This application is a national phase application of International Patent Application PCT/EP2018/058100, filed on Mar. 29, 2018 and titled "Arrangement Of Individual Seats For Passengers Of An Aeroplane," which is related to and claims priority to France Patent Application No. 1752815, filed on Mar. 31, 2017, both of which are hereby incorporated by reference in their entireties.

FIELD OF INVENTION

The present invention relates to an arrangement of individual seats for passengers of an aircraft.

BACKGROUND

The "Business Class" type of aircraft seat offers passengers different comfort positions, from a "sitting" position to an "extended" position in which the seat creates a substantially horizontal lying surface for the passenger.

SUMMARY

Intermediate comfort positions are also proposed, such as the "relax" position in which the backrest is heavily reclined. Generally, these positions are obtained by the inclination of the backrest, which pivots about a horizontal axis that is perpendicular to the axis of the seat. The passenger can then remain on the seat during transitions between the different positions.

The bed generally consists in particular of the backrest, the seat, a leg rest and a foot rest; said leg and foot rests can be secured or linked to the seat kinematics.

Certain "Business Class" aircraft cabin seating arrangements allow direct access to an aisle for all passengers via a passage arranged between two seats which are arranged one behind the other in the longitudinal direction of the aircraft. Passengers can thus easily get out of their seat, especially when the seat is in the "extended" position, without disturbing other passengers.

In some configurations, the seats are arranged along two longitudinal columns and the seats in the same row have inclined axes, i.e. they form a non-zero angle with respect to the longitudinal axis of the arrangement.

US2007246981 describes a chevron configuration, also referred to as a "herringbone" configuration, in which the seats in the same row face inwards towards the longitudinal axis of the arrangement, i.e. their axes intersect the longitudinal axis of the aircraft at the front of the seats.

In the "reverse herringbone" configuration described in WO03/013903, the seats in one row face outwards from the longitudinal axis, i.e. the axes intersect the longitudinal axis of the aircraft at the rear of the seats. The passengers are thus oriented towards the aisle of the cabin.

The invention aims to improve the modularity of the existing configurations by proposing an arrangement of individual seats intended to be installed in an aircraft cabin, said arrangement being on a longitudinal axis and comprising a plurality of sets of two seats arranged one behind the other, each seat having an axis, the seat arrangement comprising at least one set of two seats facing inwards towards the longitudinal axis of the arrangement, characterized in that:
at least one set of seats, referred to as an end set, is arranged at one end of the arrangement,
said end set comprising a first seat and a second seat, each seat being convertible between a sitting position and an extended position in which the seat defines a bed surface, and
an intermediate element arranged between the first seat and the second seat of the end set,
the intermediate element having a surface, referred to as an intermediate surface, located in the same plane as the bed surfaces of the first seat and the second seat, such that the bed surfaces of the first seat and the second seat and the intermediate surface form a shared bed surface, the intermediate surface filling a space between the bed surfaces of the first seat and the second seat at least in part.

According to one embodiment, the seat arrangement further comprises at least one set of two seats facing outwards from the longitudinal axis of the arrangement.

According to one embodiment, the intermediate element is a supplementary seat and in that the intermediate surface is defined by a seat surface of the supplementary seat.

According to one embodiment, the supplementary seat further comprises a backrest.

According to one embodiment, the intermediate element is formed by a console.

According to one embodiment, the intermediate surface is defined by a surface of the console in the lowered position.

According to one embodiment, the intermediate element is formed by at least one armrest that is retractable between a raised position and a lowered position.

According to one embodiment, the intermediate surface is defined by a surface of the armrest in the lowered position.

According to one embodiment, the intermediate surface is extended by a member for maximizing the bed surface, in particular having a triangular shape, which fills a space remaining between the bed surfaces of the first seat and the second seat.

According to one embodiment, said arrangement comprises a module provided with a first foot region associated with the first seat and a second foot region associated with the second seat, the first foot region and the second foot region defining a foot surface shared by both seats.

According to one embodiment, the module is provided with a retractable partition wall arranged between the first foot region and the second foot region.

According to one embodiment, the module does not have a partition wall between the first foot region and the second foot region.

According to one embodiment, said arrangement comprises an end wall that is transverse to the longitudinal axis of the arrangement.

According to one embodiment, the transverse end wall has at least one screen.

According to one embodiment, two oblique walls provide a connection between one end of the transverse wall and a wall extending in parallel with the longitudinal axis of the arrangement. This reduces the footprint of the arrangement at the start of the aisle in particular. It is then possible for there to be a clearance between the oblique walls and end pieces of furniture in the cabin.

According to one embodiment, said arrangement comprises a retractable central partition extending along the longitudinal axis to separate the seats in the end set.

Of course, the various features, variants and/or embodiments of the present invention may be associated with each other in various combinations provided that they are not incompatible or mutually exclusive.

BRIEF DESCIPRTION OF THE DRAWINGS

The present invention will be better understood and other features and advantages will become apparent upon reading the following detailed description comprising the embodiments given by way of illustration with reference to the appended drawings, which are provided by way of non-limiting example, which will serve to improve the understanding of the present invention and its implementation and, where appropriate, to contribute to its definition, and in which.

DETAILED DESCRIPTION

It should be noted that, in the drawings, the structural and/or functional elements shared by the various embodiments may have the same reference signs. Thus, unless otherwise stated, such elements have identical structural, dimensional and material properties.

FIGS. 1a to 1d show an arrangement 10 of individual seats intended to be installed in an aircraft cabin. This arrangement 10 comprises a first set 11.1 of two seats 13.1, 13.2 and a second set 11.2 of two seats 13.3, 13.4. In each set 11.1, 11.2, the seats (13.1 and 13.2 for the set 11.1, and 13.3 and 13.4 for the set 11.2) are positioned side by side.

Each seat 13.1-13.4 has an axis X1 corresponding to the intersection between a horizontal plane and a plane of symmetry of the seat. Each seat 13.1-13.4 is preferably convertible between a "sitting" position corresponding to the position used in particular during the stopping, take-off, and landing phases of the aircraft, and an "extended" position in which the seat 13.1-13.4 defines a substantially horizontal bed surface for the passenger. Each seat 13.1-13.4 may also assume intermediate positions, referred to as relax positions, between these two end positions.

The arrangement 10 has a longitudinal axis X2 which may extend along the axis X3 of the aircraft cabin or may be parallel to this axis X3. In a variant, the axis X2 may be substantially perpendicular to or form any angle with respect to the axis X3 of the cabin. The longitudinal axis X2 passes between the seats 13.1 and 13.2 (or 13.3 and 13.4) of the same set 11.1 (or 11.2). This axis X2 can be located in a plane of symmetry of the arrangement 10.

More precisely, a first seat 13.1 of the first set 11.1 is positioned opposite a first seat 13.3 of the second set 11.2 and a second seat 13.2 of the first set 11.1 is positioned opposite a second seat 13.4 of the second set 11.2.

In addition, the first seat 13.1 and the second seat 13.2 of the first set 11.1 face inwards towards the longitudinal axis X2 of the arrangement 10. The first seat 13.3 and the second seat 13.4 of the second set 11.2 face outwards from the longitudinal axis X2 of the arrangement 10.

Preferably, the axes X1 of the seats 13.1, 13.2, 13.3, 13.4 form substantially the same angle relative to the longitudinal axis X2 of the arrangement 10. The axes X1 of the seats of the same set 11.1, 11.2 intersect the longitudinal axis X2 of the arrangement 10 substantially at the same point.

Thus, the axes X1 of the seats 13.1, 13.2 of the first set 11.1 intersect the longitudinal axis X2 at the front of the seats 13.1, 13.2 substantially at the same point, whereas the axes X1 of the seats 13.3, 13.4 of the second set 11.2 intersect the longitudinal axis X2 at the rear of the seats 13.3, 13.4 substantially at the same point.

Alternatively, the axes X1 of the seats of the same set 11.1, 11.2 may be offset relative to each other along the longitudinal axis X2, such that the axes of the seats of the same set 11.1, 11.2 intersect the longitudinal axis X2 at different points.

Each seat 13.1, 13.2, 13.3, 13.4 is integrated into a corresponding housing of a base module 15. This base module 15 comprises an armrest 16 located on one side of the seat 13.1-13.4 and a cushion 17 located on the other side of the seat 13.1-13.4. The cushion 17 is preferably a cushion for maximizing the padding intended to be positioned in the extension of the lying plane of the seat 13.1-13.4 when it is in the extended position. The armrest 16 may be an armrest that is retractable between a raised position allowing the passenger to rest their elbows when the corresponding seat 13.1-13.4 is in a sitting position and a lowered position in which the armrest 16 is located in the extension of the seat 13.1-13.4 in the extended position.

Figure 1A:
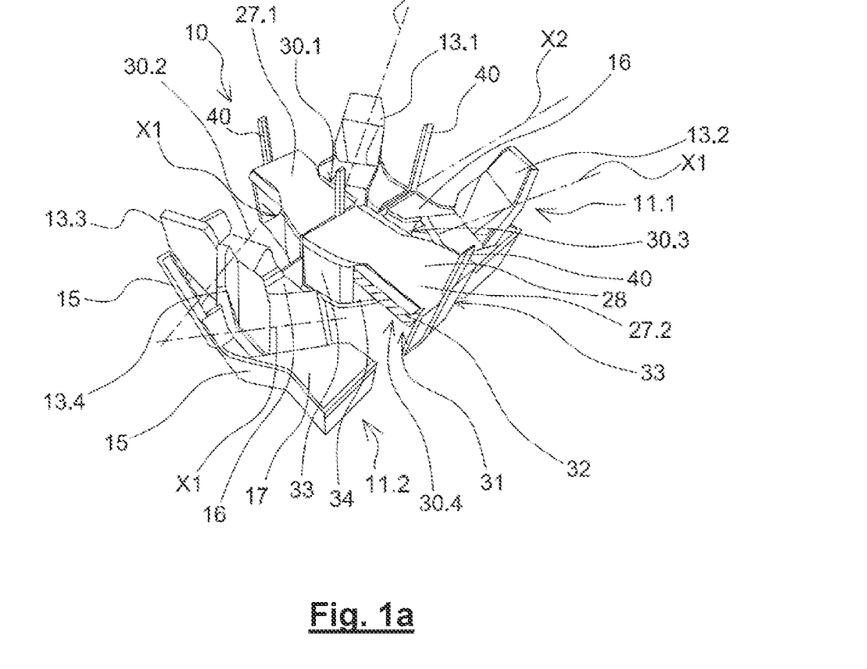
FIG. 1a to 1d are perspective views of an embodiment of a seat arrangement that can be used in a general arrangement according to the invention.
Figure 1B:
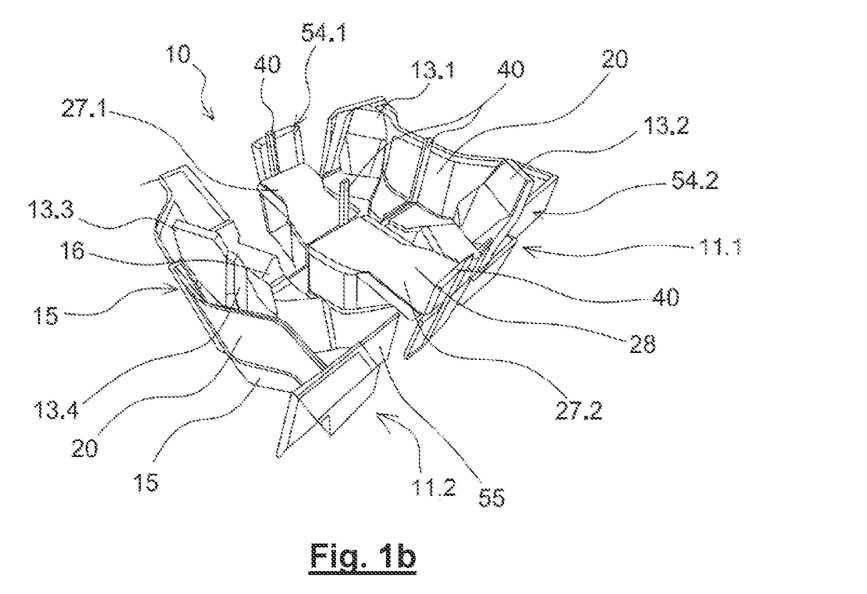

Each seat 13.1-13.4 is also associated with a shell 20, as is visible in particular in FIG. 1b, which is positioned around its backrest to isolate the seat 13.1-13.4 from a neighboring arrangement 10. The shells 20 of the seats 13.1 and 13.2 (or 13.3 and 13.4) of the same set 11.1 (or 11.2) can be formed in one piece.

Figure 2:
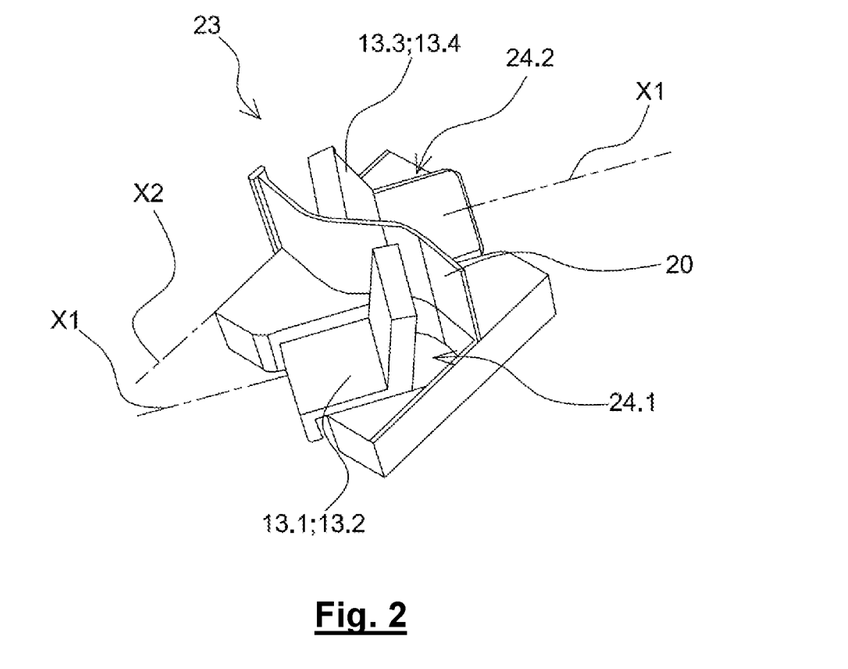
FIG. 2 is a perspective view of a dual module that may be used to provide a plurality of seat arrangements according to the present invention.

If a plurality of arrangements 10 are positioned one behind the other, the seat 13.1 (or 13.2) of the first set 11.1 and the adjacent seat 13.3 (or 13.4) of the second set 11.2 positioned along the same longitudinal column can be obtained from a dual module 23. As shown in FIG. 2, the dual module 23 comprises two housings 24.1, 24.2 for receiving the seats 13.1 and 13.3 (or 13.2 and 13.4) such that the seats 13.1 and 13.3 (or 13.2 and 13.4) face in two opposite directions with respect to each other. One of the seats 13.1 (or 13.2) faces towards the longitudinal axis X2, while the other seat 13.3 (or 13.4) faces outwards from the longitudinal axis X2. The axes X1 of the two seats 13.1 and 13.3 (or 13.2 and 13.4) installed on the same module 28 are preferably substantially parallel to each other. A shell 20 extends between the two seats 13.1 and 13.3 (or 13.2 and 13.4) of the dual module 23. In addition, in the dual module 23, the backrests of the seats 13.1 and 13.3 (or 13.2 and 13.4) in the extended position overlap at least partially in the longitudinal direction Y.

Furthermore, the arrangement 10 comprises a first central console 27.1 and a second central console 27.2 positioned between the first set of seats 11.1 and the second set of seats 11.2. The central consoles 27.1, 27.2 each have a planar upper face 28 on which the passenger can, in particular, place objects.

The first central console 27.1 has a first foot region 30.1 and a second foot region 30.2 that are open in two opposite directions relative to each other and are associated with the first seat 13.1 of the first set 11.1 and the first seat 13.3 of the second set 11.2, respectively. Thus, the foot region 30.1 is positioned in the extension of the first seat 13.1 of the first set 11.1 when said first seat is in the extended position. The opposite foot region 30.2 is positioned in the extension of the first seat 13.3 of the second set 11.2 when said first seat is in the extended position.

Similarly, the second central console 27.2 has a first foot region 30.3 and a second foot rest region 30.4 that are open in two opposite directions relative to each other and are associated with the second seat 13.2 of the first set 11.1 and the second seat 13.4 of the second set 11.2, respectively. Thus, the foot region 30.3 is positioned in the extension of the second seat 13.2 of the first set 11.1 when said second seat is in the extended position. The opposite foot region 30.4 is positioned in the extension of the second seat 13.4 of the second set 11.2 when said second seat is in the extended position.

In each central console 27.1, 27.2, the foot regions 30.1 and 30.2 (or 30.3 and 30.4) overlap at least in part along the longitudinal axis X2. There is thus at least one straight line perpendicular to the longitudinal axis X2 which intersects the two foot regions 30.1 and 30.2 (or 30.3 and 30.4) of the same central console 27.1 (or 27.2). More specifically, the foot regions 30.1-30.4 are formed by housings 31 that are open towards the corresponding seat 13.1-13.4 and a substantially horizontal footrest cushion 32 which is positioned inside the housing 31 and on which the passenger can rest their feet, as shown in FIG. 1a.

The housings 31 formed in a central console 27.1, 27.2 are each delimited by a base 33, the bases 33 of the two housings 31 provided in the same console 27.1, 27.2 being interconnected by a shared partition 34 inclined relative to the longitudinal axis X2.

In order to give the central consoles a modular nature, said central consoles 27.1, 27.2 are advantageously independent of one another. As a variant, the consoles 27.1, 27.2 may, however, be formed in one piece so as to only form one single part.

Moreover, a central partition 37 extends along the longitudinal axis X2 to separate the seats 13.1, 13.2 (or 13.3 and 13.4) of the same set 11.1, 11.2.

Figure 1C:
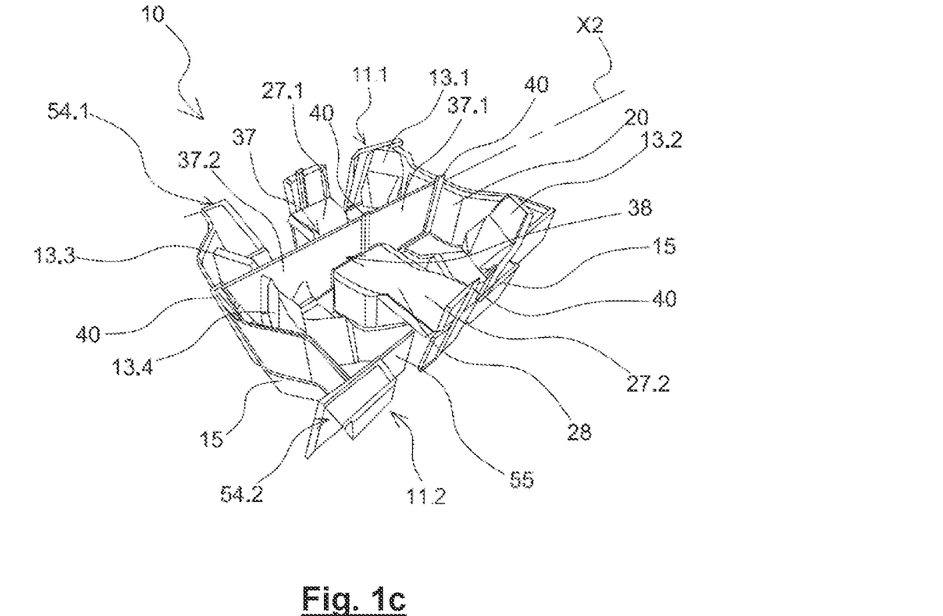

As shown in FIG. 1c, such a configuration makes it possible to produce two face-to-face seat modules, namely a first module formed by the seats 13.1 and 13.3, and a second module formed by the seats 13.2 and 13.4.

The central partition 37 is advantageously retractable between a deployed position and a stowed position. In the stowed position, the central partition 37 is housed in a space 38 between the two central consoles 27.1, 27.2 at least in part.

The central partition 37 is formed in one or two parts 37.1, 37.2 in order to independently isolate the side-by-side seats 13.1 and 13.2 (or 13.3 and 13.4) of the two sets of seats 11.1, 11.2.

In a particular embodiment, the central partition 37 is mechanically connected to uprights 40. Indeed, the arrangement 10 comprises vertically extending hollow uprights 40 to guide wiring harnesses that in particular carry power and data signals for multimedia systems associated with the seats 13.1-13.4. It is thus possible to take advantage of the presence of these uprights 40 and use them as supports for securing the central partition 37 and the other partitions of the arrangement 10, as explained below.

For this purpose, the uprights 40 supporting the central partition 37 may comprise slides to allow each part 37.1, 37.2 of the partition 37 to move in a vertical direction in order to move from one position to the other. In a variant, the movement of the central partition 37 may be a lateral movement or a rotation or a combination of these movements.

Furthermore, a transverse partition 43 extends in a direction perpendicular to the longitudinal axis X2 of the arrangement 10 to separate the two sets of seats 11.1 and 11.2.

Figure 1D:
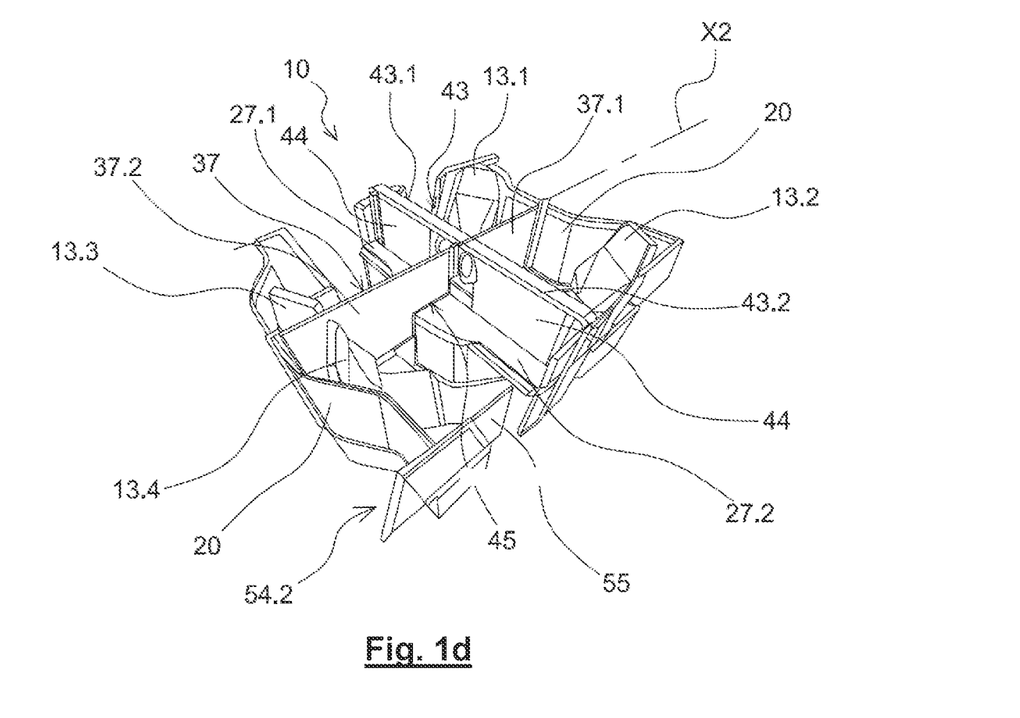

In the embodiment in FIG. 1d, the transverse partition 43 has screens 44 which are each associated with a seat 13.1-13.4 of the arrangement 10. The transverse partition 43 thus has two screens 44 on each of its faces. As above, the uprights 40 may serve as a support structure for the transverse partition 43. In certain configurations, the transverse partition 43 may comprise shaped parts for covering and concealing the uprights 40.

The transverse partition 43 is preferably formed in two parts 43.1, 43.2 which may be retractable between a deployed position and a stowed position.

Figure 3A:
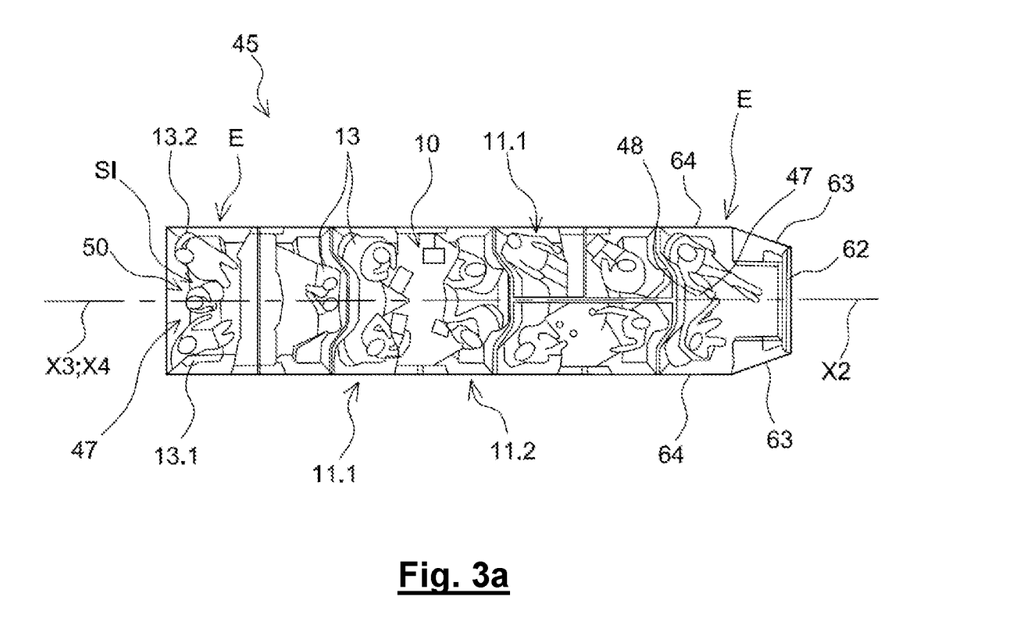
FIGS. 3a to 3c show different forms of seat arrangements according to the invention.
Figure 3B:
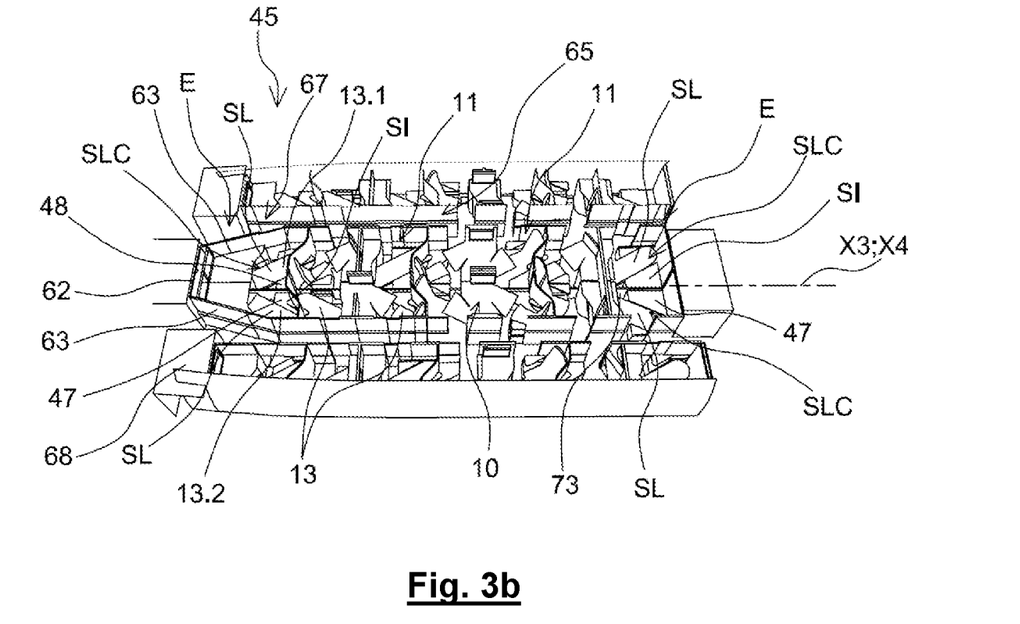
Figure 3C:
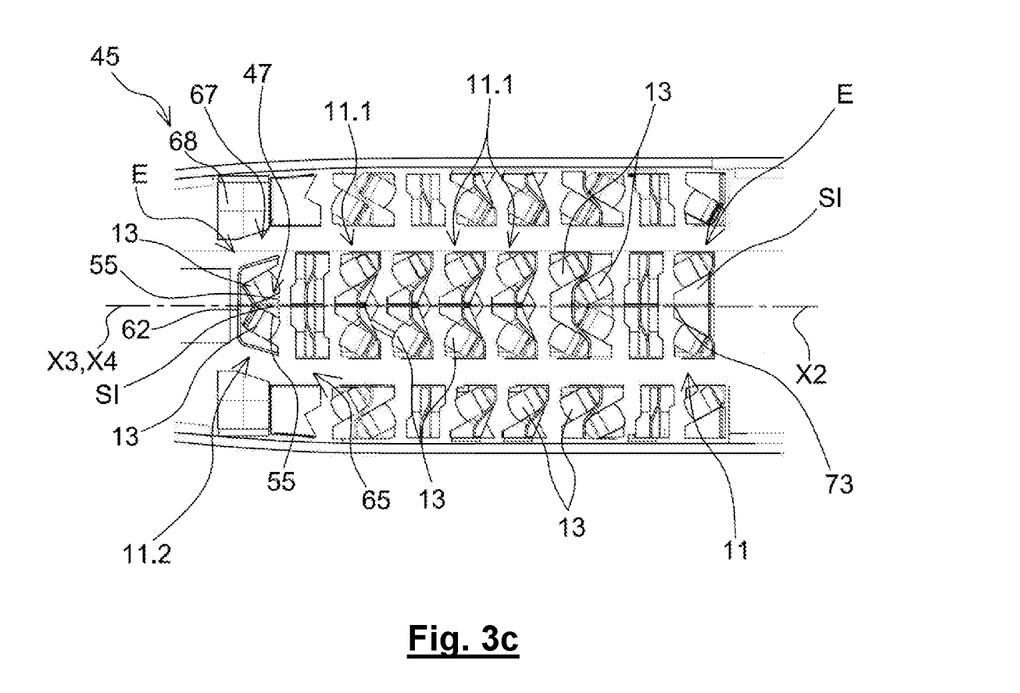

FIGS. 3a to 3c show examples of an arrangement 45 of seats 13 according to the invention intended to be installed in an aircraft cabin. The arrangement 45 on the longitudinal axis X4 comprises a plurality of sets of two seats 11 arranged one behind the other in a column. The seat arrangement 45 comprises at least one set of two seats 13.1, 13.2 facing inwards towards the longitudinal axis X4 of the arrangement 45, and preferably, but this is not obligatory, at least one set of two seats 13.3, 13.4 facing outwards from the longitudinal axis X4. The axis X4 may be parallel to or may coincide with the axis X3 of the aircraft cabin.

The arrangements 45 in FIGS. 3a and 3b thus comprise four sets 11 of two seats 13 facing inwards towards the axis X4 and three sets 11 of two seats 13 facing outwards from the axis X4. The arrangement 45 in FIG. 3c comprises five sets 11 of two seats 13 facing inwards towards the axis X4 and two sets 11 of two seats 13 facing outwards from the axis X4.

An arrangement 45 may advantageously comprise at least one arrangement 10 with four seats 13 as described above with reference to FIGS. 1a to 1d to make it easier to integrate the set, but this is not essential. The axis of the arrangement X2 thus coincides with the axis X4 of the arrangement 45.

The arrangement 45 comprises two sets of seats E, referred to as end sets E, which are each arranged at one end of the arrangement 45. An end seat set E comprises a first seat 13 and a second seat 13, each seat 13 being convertible between a sitting position and an extended position in which the seat defines a bed surface SL.

The seats 13 in the end set E can face inwards towards the axis X4 ("chevron" or "herringbone" arrangement, similar to that of the seats 13.1 and 13.2 described above), as is the case for the end sets E in FIGS. 3a and 3b. Alternatively, the seats in the end set E can face outwards from the axis X4 ("inverted chevron" or "reverse herringbone" arrangement, similar to that of the seats 13.3 and 13.4 described above), as is the case for the end set E on the left in FIG. 3c.

In addition, an intermediate element 47 is arranged between the first seat 13.1 and the second seat 13.2 (or 13.3 and 13.4) of at least one end set E. The intermediate element 47 has a surface, referred to as an intermediate surface SI, located in the same plane as the bed surfaces SL of the first seat 13.1 and the second seat 13.2, such that the bed surfaces SL of the seats 13.1, 13.2 and the intermediate surface SI form a shared bed surface SLC. The intermediate surface SI is located in the extensions of the bed surfaces SL of the first and the second seat and fills the space between the bed surfaces SL of the first seat 13.1 and the second seat 13.2 at least in part.

Figure 4A:
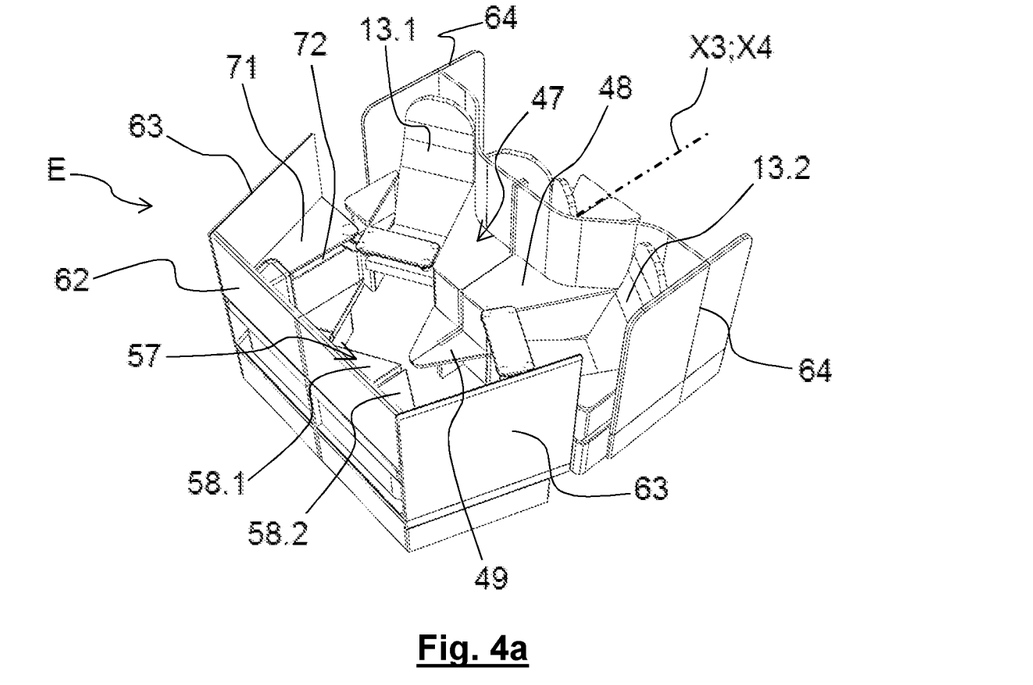
FIGS. 4a to 4c show a configuration of a set of two seats positioned at one end of a seat arrangement according to the invention.
Figure 4B:
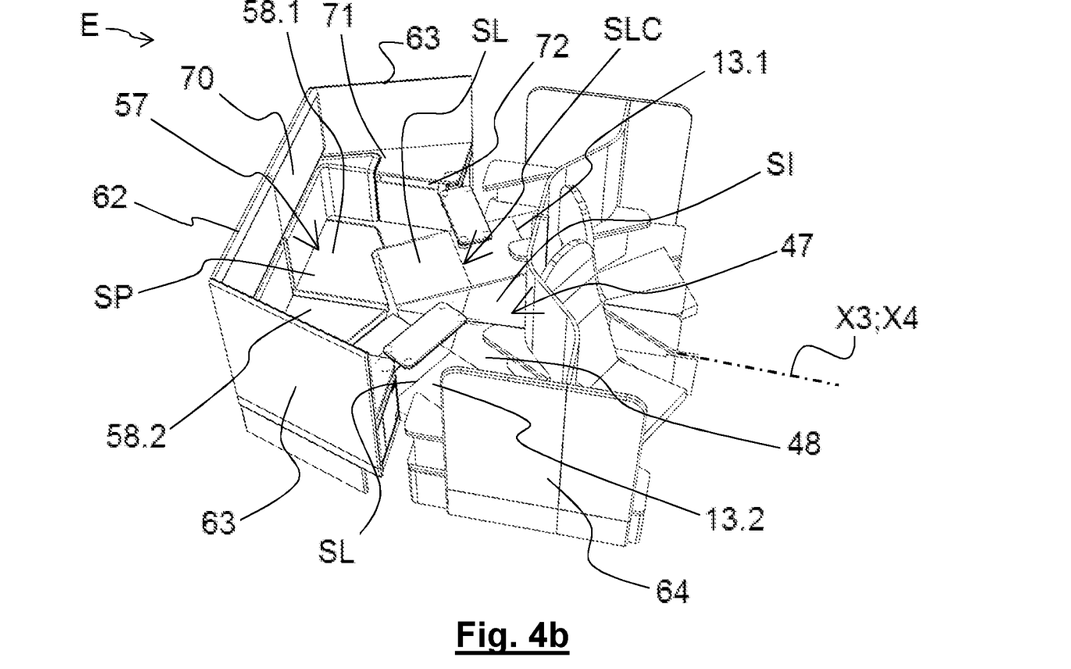
Figure 4C:
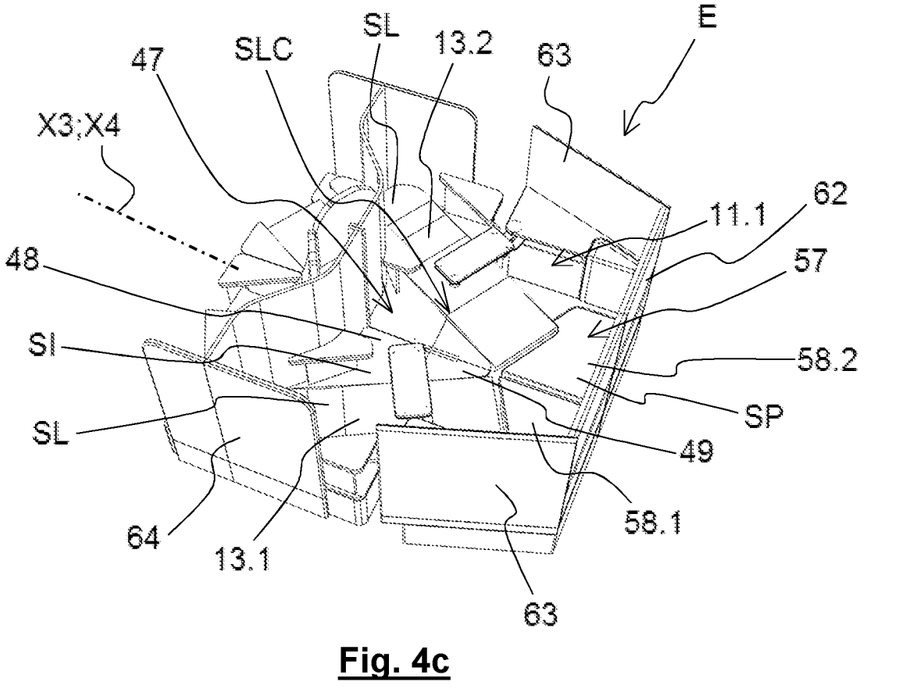

In the embodiment in FIGS. 4*a* to 4*c*, the intermediate element 47 is formed by a console 48 that is arranged between the two seats 13.1, 13.2 and is retractable between a raised position in which the console 48 forms an armrest and a lowered position in which the upper face of the console 48 forms the intermediate surface SI located in the same plane as the two seats 13.1, 13.2 in the extended position in order to fill the space between the two seats 13.1, 13.2 at least in part.

For this purpose, the console 48 has a triangular or trapezoidal shape which takes into account the inclination of the seats 13.1 and 13.2. Where necessary, the console 48 may be associated with a fixed end 49 of triangular shape.

Alternatively, a fixed console 48 could be used which has an upper face that defines the intermediate surface SI located in the same plane as the bed surfaces SL of the seats 13.

Figure 5A:
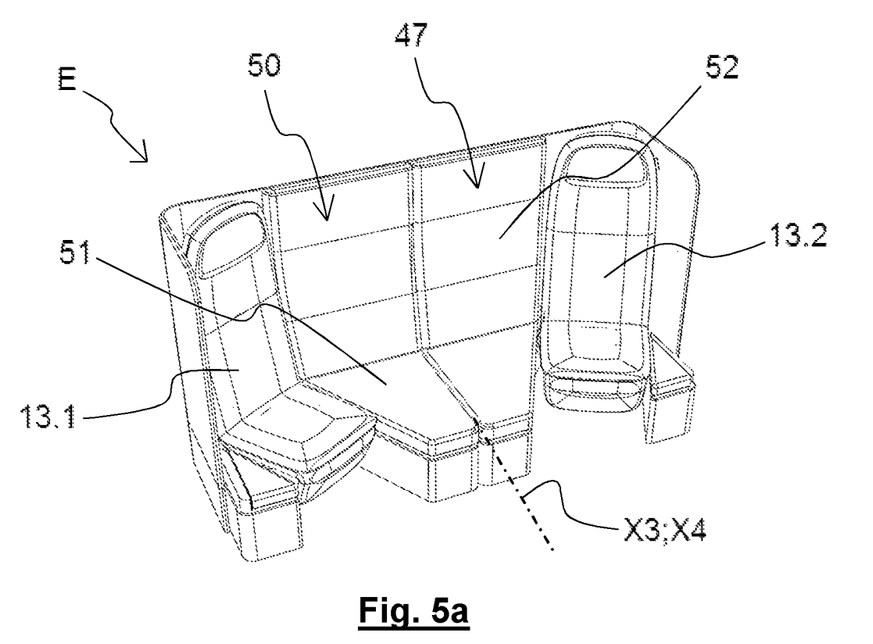
FIGS. 5a and 5b show a configuration variant of a set of two seats positioned at one end of a seat arrangement according to the invention.
Figure 5B:
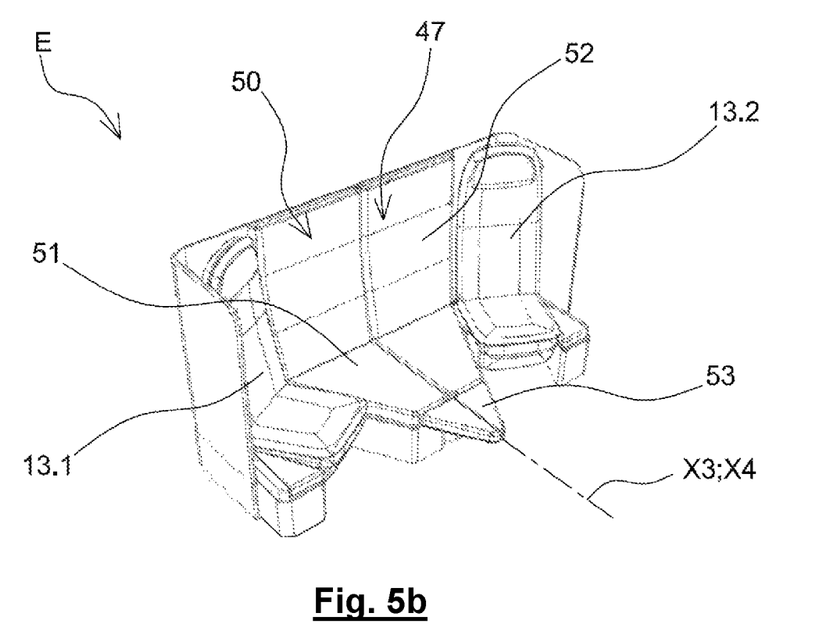

In the embodiment in FIGS. 5*a* and 5*b*, the intermediate element 47 is a supplementary seat 50 arranged between the two seats 13.

The intermediate surface SI is defined by the seat surface 51 of the supplementary seat 50 which is located in the same plane as the bed surfaces SL of the seats 13.1, 13.2 so as to form the bed surface SL shared by the two seats 13.1, 13.2. This supplementary seat 50 further comprises a backrest 52. Unlike the seats 13, the supplementary seat 50 cannot be converted. It can be used by a passenger at times when it is possible for them to take off their seatbelt and move freely around the aircraft (outside of take-off or landing phases).

The intermediate surface SI defined by the seat surface 51 is extended by a member 53 for maximizing the triangular bed surface SL that fills a space remaining between the seat surface 51 of the supplementary seat 50 and the bed surfaces SL of the first and the second seat. The maximizing member 53 is formed by a cushion, for example, which is triangular in this case, and which is retractable between a retracted position and a deployed position.

The seat surface 51 and the backrest 52 may each be formed in one piece or may be formed by two half-cushions that are each associated with a seat 13.1, 13.2 and positioned side by side.

The supplementary seat 50 may comprise an anchoring system for a baby seat.

It is also possible to install a supplementary seat 50 without the backrest cushion 52.

In the embodiment in FIG. 3*c*, the intermediate member 47 is formed by at least one armrest 55 that is arranged between the seats 13.3, 13.4 at the left end following an inverted chevron configuration. This armrest 55 is retractable between a raised position in which it can be used by the passenger and a lowered position. The intermediate surface SI is defined by a surface of the armrest 55 in the lowered position. In this case, there is one armrest 55 per seat, but it is possible to provide a single armrest 55 for the two seats 13.3, 13.4.

Figure 6:
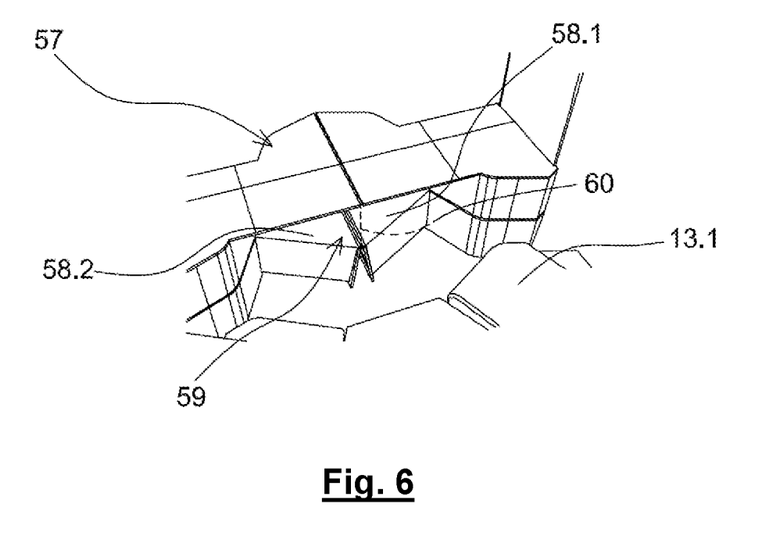
FIG. 6 shows an embodiment of a foot region shared by two seats arranged in a chevron configuration.

Furthermore, as can be seen in FIGS. 4*b*, 4*b*, 4*c* and 6, the end set E comprises a module 57 provided with a first foot region 58.1 associated with the first seat 13.1 and a second foot region 58.2 associated with the second seat 13.2. The first foot region 58.1 and the second foot region 58.2 define a foot surface SP shared by both seats 13.1, 13.2, that is to say without a partition wall between these two foot regions 58.1, 58.2. This shared foot surface SP is arranged in the same plane as the bed surfaces SL of the seats 13.1, 13.2. The foot regions 58.1, 58.2 may be formed by a cushion, in particular made of foam.

The foot regions 58.1, 58.2 may be open, as is the case in the embodiment in FIGS. 4*a*, 4*b* and 4*c*, or may be arranged within a housing 59 that is provided in the module 57 and is open towards the seats 13.1, 13.2, as shown in FIG. 6.

According to one embodiment, the module 57 may be provided with a retractable partition wall 60 arranged between the first foot region 58.1 and the second foot region 58.2. The partition wall 60 is retractable between a separation position in which the wall 60 separates the two foot regions 58.1, 58.2 and a stowed position in which the two foot regions 58.1, 58.2 are in communication with each other. In other words, the two foot regions 58.1, 58.2 and the housing 59 delimit a single space when the partition 60 is in the stowed position.

In the embodiment in FIGS. 3*a*-3*c* and 4*a* to 4*c*, at least one end set E is arranged in a space defined by an end wall 62 transverse to the longitudinal axis X4 of the arrangement 45 and two oblique walls 63 that provide a connection between one end of the transverse wall 62 and a wall 64 extending substantially in parallel with the longitudinal axis X4 of the arrangement 45. "Oblique wall" means walls 63 forming a non-zero angle relative to the longitudinal axis X4. These oblique walls 63 are inclined towards the interior of the space occupied by the end set E. The assembly of the walls 62, 63 and 64 thus has a beveled shape at one of the ends of the arrangement 45.

As can be seen in FIGS. 3*a* and 3*c*, this reduces the footprint of the arrangement 45 at the start of the aisle 65 in particular. There can then be a significant clearance 67 between the oblique walls 63 and end pieces of furniture 68 in the cabin.

The transverse end wall 62 may have a screen 70 shared by the two seats 13.1, 13.2 as shown in FIG. 4*b*. In a variant, the end wall 62 has two screens 70, one screen 70 for each passenger.

The oblique walls 63 may have side storage furniture 71. Side storage furniture 71 may be of a sufficient size to contain a passenger's luggage. Side storage furniture 71 may include a shelf compartment 72.

A retractable central partition 73 extending along the longitudinal axis X4 may be provided to separate the seats 13 in an end set E, as shown in FIG. 3*b*. This partition 73 can be moved between a raised position ensuring separation between the two seats 13 and a lowered position allowing the bed surfaces SL to be shared in particular.

The invention may also be implemented with seats installed in other modes of transport, such as seats for buses, trains, or boats.

Of course, the invention is not limited to the embodiments described above, which are provided solely by way of example. It covers various different modifications, alternative forms and other variants that may be considered by a person skilled in the art in the context of the present invention, and in particular any combination of the different modes of operation described above, which can be taken in isolation or combination.

The invention claimed is:

1. An arrangement of individual seats for an aircraft cabin, said arrangement comprising a longitudinal axis and comprising a plurality of sets of two seats, the sets arranged one behind the other, each seat having an axis, wherein, for at least one set of the plurality of sets, the two seats face inwards towards the longitudinal axis of the arrangement, wherein at least one set of the plurality of sets, referred to as an end set, is arranged at an end of the arrangement, wherein the two seats of the end set comprising a first seat and a second seat, and wherein each of the first seat and the second seat being convertible between a sitting position and an extended position in which the seat defines a bed surface, and wherein an intermediate element is arranged between the first seat and the second seat of the end set, the intermediate element having a surface, referred to as an intermediate surface, located in the same plane as the bed surfaces of the first seat and the second seat, such that the bed surfaces of the first seat and the second seat and the intermediate surface form a shared bed surface, the intermediate surface filling a space between the bed surfaces of the first seat and the second seat at least in part.

2. The arrangement according to claim 1, further comprising at least one set of two seats facing outwards from the longitudinal axis of the arrangement.

3. The arrangement according to claim 1, wherein the intermediate element is a supplementary seat and in that the intermediate surface is defined by a seat surface of the supplementary seat.

4. The arrangement according to claim 3, wherein the supplementary seat further comprises a backrest.

5. The arrangement according to claim 1, wherein the intermediate element is formed by a console.

6. The arrangement according to claim 5, wherein the console is adjustable between a raised position and a lowered position, and wherein the intermediate surface is in the same plane as the bed surfaces of the first seat and the second seat when the console is in the lowered position.

7. The arrangement according to claim 1, wherein the intermediate element is formed by at least one armrest that is retractable between a raised position and a lowered position.

8. The arrangement according to claim 7, wherein the intermediate surface is in the same plane as the bed surfaces of the first seat and the second seat when the armrest is in the lowered position.

9. The arrangement according to claim 1, further comprising an extension member movable between a retracted position and a deployed position, wherein in the deployed position, the extension member is in a space unfilled by the intermediate surface between the bed surfaces of the first seat and the second seat and in the same plane as the intermediate surface.

10. The arrangement according to claim 1, further comprising a module, the module comprising a first foot region associated with the first seat and a second foot region associated with the second seat, the first foot region and the second foot region defining a foot surface shared by both seats.

11. The arrangement according to claim 10, wherein the module comprises a retractable partition wall arranged between the first foot region and the second foot region.

12. The arrangement according to claim 10, wherein the module does not have a partition wall between the first foot region and the second foot region.

13. The arrangement according to claim 1, further comprising an end wall that is transverse to the longitudinal axis of the arrangement.

14. The arrangement according to claim 13, wherein the end wall has at least one screen.

15. The arrangement according to claim 13, further comprising two oblique walls, each oblique wall extending between a corresponding end of the end wall and a wall extending in parallel with the longitudinal axis of the arrangement.

16. The arrangement according to claim 1, further comprising a retractable central partition extending along the longitudinal axis to separate the seats in the end set.

* * * * *